Inventor:
ALFRED POLLAK
By: Eric D. Frankel
Patent Agent

May 30, 1961 A. POLLAK 2,986,703

PHASE COMPARISON CIRCUIT

Filed Feb. 10, 1958 2 Sheets-Sheet 2

Inventor:
ALFRED POLLAK
By: Eric H. Frankel
Patent Agent 2,986,703
Patented May 30, 1961

2,986,703

PHASE COMPARISON CIRCUIT

Alfred Pollak, Hannover-Ricklingen, Germany, assignor to Telefunken G.m.b.H., Berlin, Germany Filed Feb. 10, 1958, Ser. No. 714,273

Claims priority, application Germany Apr. 6, 1957

7 Claims. (Cl. 328—133)

This invention relates to a phase comparison circuit comprising an amplifier valve to the different electrodes of which synchronising pulses with upward or downward going control flanks and reference pulses are fed.

A phase comparison circuit for television receivers known as "synchro-guide" comprises an amplifier valve having mixed synchronising and reference pulses fed to the control electrode thereof, in such a manner that the mean anode current depends on the phase of both kinds of pulses. In such a circuit, however, a one-sided shift of the control voltage generated is caused by the occurrence of interference pulses, because said interference pulses have always one direction only and therefore can modify the mean anode current in one direction only, e.g. the positive direction. Since such a one-sided shift of the control voltage occurs also in presence of severe picture noise, synchronisation is particularly dependent on receiving conditions in such a type of phase comparison circuit.

It is further known to superpose a reference pulse derived from the output deflecting stage of a television receiver on a two-sided synchronising pulse, to rectify the composite pulse thus obtained and to use it as a control voltage. In this type of phase comparison circuit too, interference pulses can result in a one-sided shift of the control voltage. Moreover, the control voltage generated in this last-mentioned circuit is affected by load fluctuations of the high voltage source connected to the deflecting stage, so that such a phase comparison circuit is relatively unsteady.

It has also been propsed to apply the synchronising, differentiated pulse and the reference pulse to two control electrodes of a multi-grid valve, so as to obtain a mean anode current depending on the phase of both pulses through a multiple superposition. This circuit is however just as liable to interference as those previously mentioned.

According to the invention, there are provided means for cutting off the amplifier valve between two successive reference pulses and causing it to conduct only for the duration of the reference pulse.

According to a preferred embodiment of the invention, the reference pulse is derived from the oscillator controlled by the control voltage and fed to the control grid of a triode having a relatively great magnification factor (through grip), while the synchronising pulse is fed to the anode of the same valve from the separator stage via a differentiating member.

Figure 1:
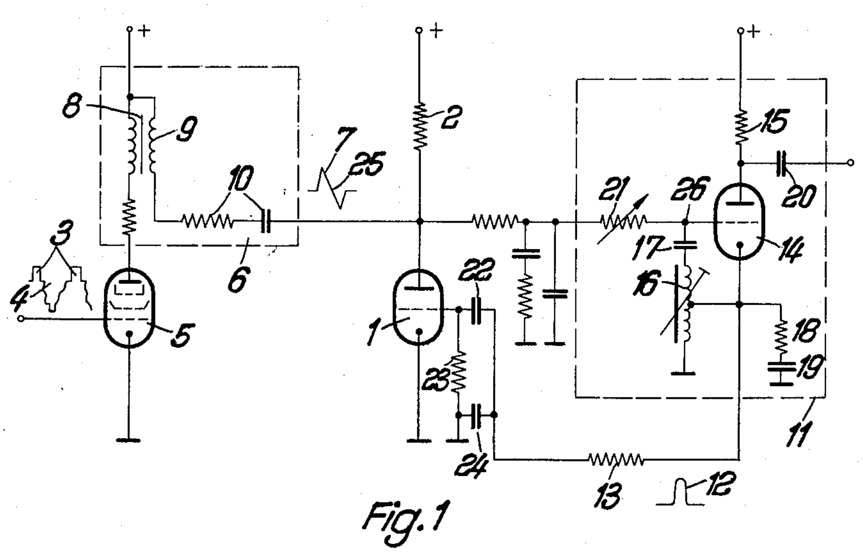
Figure 2:
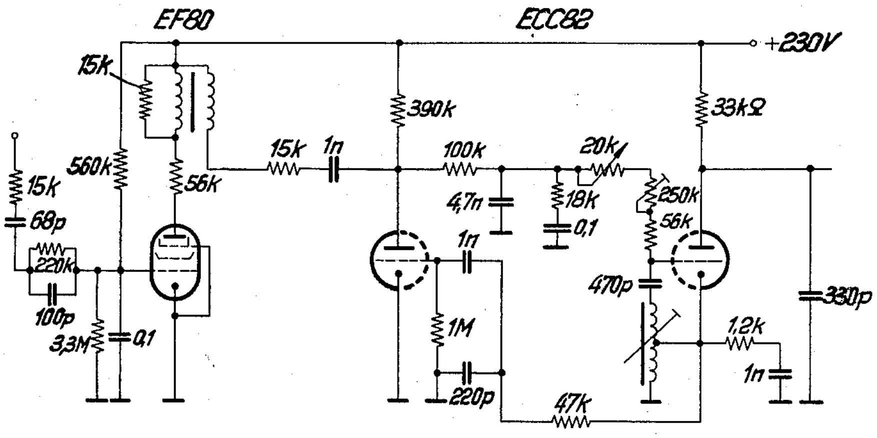
Figure 3:
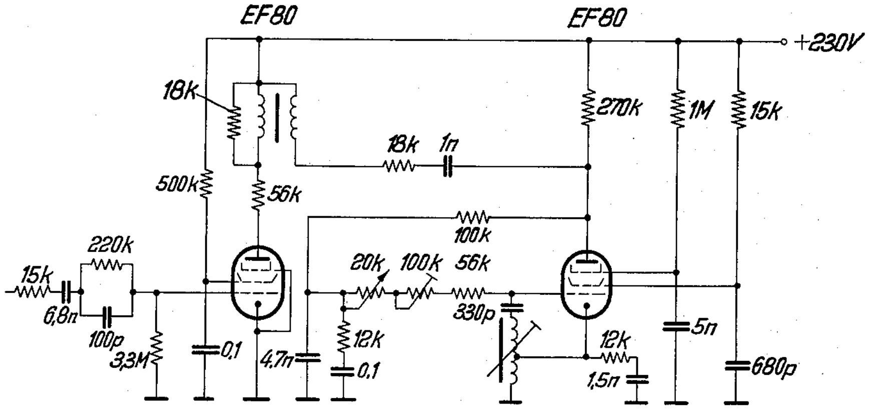

In order that the invention may be clearly understood and readily carried into effect the same will be described with reference to the accompanying drawings, in which:

Figure 1 is a schematic diagram of a phase comparison circuit, embodying the principles of this invention, Figure 2 is a schematic digram of the circuit of Figure 1 with the values shown, and Figure 3 is a schematic diagram of a modification of the circuit of Figure 1.

In Fig. 1 there is shown a phase comparison circuit comprising a triode 1 having the anode thereof connected to a positive operating voltage source via a resistor 2 and the cathode thereof grounded directly. Synchronising pulses 7 differentiated via a pulse shaping circuit 6 are applied to the anode of the valve 1 from an amplifier valve 5 used to separate synchronising pulses 3 from the video signal 4. Said pulse shaping circuit 6 can have any known construction and consists in the present case of a transformer 8 whose secondary winding 9 is connected to the aode of the valve 1 through a R-C member 10. Reference pulses from an oscillator 11 are applied to the control grid of the valve 1 via a resistor 13. The oscillator 11 may be of any conventional construction (for example, a line deflecting stage) but preferably comprises a so-called self-stabilised, cathode-coupled oscillator characterised by a particularly simple design. The blocking oscillator 11 consists of a triode 14 having its anode connected to a positive operative voltage source via a resistor 15. Between the control grid and the earth there is connected an adjustable feedback transformer 16 in series with a condenser 17. The feedback transformer 16 has its tap connected directly to the cathode of the valve 14. The series network comprising the resistor 18 and the condenser 19 is arranged in parallel with the portion of the feedback transformer 16 between the tap and the earth, said arrangement forming a parallel resonant circuit (flywheel circuit) tuned approximately to the relaxation frequency (say, 1.4 times the relaxation frequency). Oscillations which are set up at the anode of the valve 14 are applied to the following stage (not shown) via a condenser 20. The frequency of the blocking oscillator 11 is controlled automatically by a smoothed control voltage derived from the anode of the valve 1 via the resistor 21 or manually by modification of the feedback transformer 16. The reference pulse 12 for generating the control voltage for the aforedescribed blocking oscillator is derived from the cathode of the valve 14.

The control grid of the valve 1 is biased negatively with respect to the cathode thereof, so that said valve conducts only on the occurrence of a new reference pulse. This can be achieved either by means of a fixed negative bias or by peak-rectifying reference pulses in the grid-cathode path of the valve 1. In the latter case there are connected between control grid and earth the condenser 22 and the resistor 23 for bias generation and the resistor 13 and the condenser 24 for phase shift of the reference pulses. Operation of the phase comparison circuit so far decribed will be explained hereafter more in detail.

It will be assumed that at the beginning of the operation cycle no synchronising pulse 7 from the valve 5 reaches the anode of the valve 1, so that the anode voltage of valve 1 determines the control voltage for the blocking oscillator 11. Said control voltage causes the blocking oscillator to operate at a well-defined frequency at which the reference pulses 12 are fed to the control grid of the valve 1 and render said valve periodically conducting. Thereby, a mean anode voltage is set up at the anode of the valve 1, said voltage depending on the inner resistance of the valve and the blocking oscillator circuit and determining the mean frequency of the blocking oscillator. On the occurrence of the differentiated pulses 7 the anode current in the valve 1 is caused to vary by an amount given by the sum voltage of the mean anode voltage and the superimposed differentiated pulses 7 during the duration of the reference pulse 12 at the anode of the valve 1. According to the phase of the reference pulse 12 and the differentiated pulse 7, there will then be set up a control voltage varying continuously in response to the control flank of the synchronising pulse, said control voltage being used to adjust the blocking oscillator frequency. The reference pulse phase is so adjusted, such as by the fine control of the blocking oscillator, that the valve 1 transmits the reference pulses 12 always at the time of the means value 25 of the differentiated pulses 7, so that the control flank is equal in both directions.

Reference pulses 12 can obviously be derived from another point of the blocking oscillator 11, for example from the junction 26.

A preferred embodiment of the circuit according to Fig. 1 is illustrated in Fig. 2 with the corresponding values; both triodes 1 and 14 can be designed as a double triode.

Another embodiment of the invention is shown in Fig. 3 where both triodes 1 and 14 are replaced by a pentode (say, the pentode EF 80). In this embodiment, the screen grid-cathode path is connected as a cathode coupled blocking oscillator. For phase comparison, the pentode is operated in the region below the knee of the anode current/anode voltage characteristic, since the anode current can then be controlled effectively by modification of the anode voltage. Performance of this circuit is substantially the same as that of circuits shown in Figs. 1 and 2.

As compared with conventional circuits, circuits according to the invention have the advantage of a satisfactory symmetry point for interference existing in pulse gaps. This can be explained by the fact that the synchronizing pulse voltage and also the interference pulses which may occasionally occur give a voltage value of 0 volt after smoothing. When the reference pulse is applied to this zero value (point 25) the whole interference is suitably balanced and therefore cancelled. When the phase is shifted in either direction, opposite control voltages are produced and the interference action is also bilateral. The circuit according to the invention behaves therefore like a symmetrical discriminator. A particular advantage of the circuits according to the invention consists in that the tendency to so-called control fluctuations is considerably small as compared with conventional discriminator circuits. A further advantage is that the amplitude of the reference pulses has no influence on the magnitude of the control voltage, since a so-called scanning process is here involved, whereby the valve 1 acts simultaneously as a limiter.

The differentiating transformer 8 used to differentiate the synchronizing pulses is unnecessary, when the separator circuit is designed as a two-stage circuit, this giving rise likewise to a 180° phase reversal.

The invention is not confined to circuits where differentiated pulses are fed to the anode of a valve and reference pulses are fed to another control electrode thereof, but it also refers to amplifier valves where the aforementioned pulses are fed to different control grids.

I claim:

1. A phase comparator for comparing the phase of two pulses and delivering an output voltage varying in magnitude depending on the degree of phase coincidence, comprising an electron discharge amplifier valve comprising a plurality of electrodes which include a first electrode which emits electrons, a second control electrode and a third electrode which receives electrons; differentiating means connected with a source of first pulses and delivering a first signal symmetrical about zero to said third electrode; means for biasing said discharge device to a non-conducting state; means for connecting a source of second pulses and delivering second pulse signals to said second electrode to overcome said bias during each second pulse; a resistor; and means for connecting a source of direct current in series with said first electrode, said third electrode and said resistor, the potential at said third electrode comprising said output voltage and being determined by the first signal, the second signal, the relative phase thereof, and the potential of the source of direct current when said first signal and second signal substantially coincide, and being determined by the potential of said source of direct current when said first and second signals do not coincide.

2. The phase comparator defined in claim 1, wherein said amplifier valve comprises a vacuum tube, wherein said first signal is fed to the third electrode comprising the anode of said valve and wherein said second signal is fed to the second electrode comprising the control grid of said valve.

3. A phase comparison circuit according to claim 2 wherein the amplifier valve has a fixed negative bias.

4. A phase comparison circuit according to claim 2 wherein the negative bias is obtained by peak rectifying reference pulses in the control grid-cathode path of the amplifier valve.

5. A phase comparison circuit according to claim 2 wherein said second signal pulses are derived from an oscillator, in particular from a blocking oscillator connected with and synchronized by the output voltage derived from the amplifier valve.

6. A phase comparison circuit according to claim 5 wherein said second signal pulses are fed to the control grid of the amplifier valve via a phase-shifting member.

7. A phase comparison circuit according to claim 5 wherein the phase comparison system and the blocking oscillator system are designed as a multi-grid valve.

References Cited in the file of this patent

UNITED STATES PATENTS

| | | |
|---|---|---|
| 2,258,877 | Barber | Oct. 14, 1941 |
| 2,483,766 | Hansell | Oct. 4, 1949 |
| 2,484,352 | Miller et al. | Oct. 11, 1949 |
| 2,572,080 | Wallace | Oct. 23, 1951 |
| 2,585,803 | Longmire | Feb. 12, 1952 |
| 2,609,501 | Guthrie | Sept. 2, 1952 |
| 2,683,802 | Williams et al. | July 13, 1954 |
| 2,685,033 | Volz | July 27, 1954 |
| 2,725,476 | Hugenholtz | Nov. 29, 1955 |
| 2,776,369 | Woodcock | Jan. 1, 1957 |